United States Patent
Anderson et al.

(10) Patent No.: US 10,243,665 B2
(45) Date of Patent: Mar. 26, 2019

(54) POSITIONAL PRECODING DERATION FOR COOPERATIVE MIMO

(71) Applicant: Cisco Technology, Inc., San Jose, CA (US)

(72) Inventors: Fred J. Anderson, Lakeville, OH (US); Oscar Bejarano Chavez, Cleveland, OH (US); Matthew A. Silverman, Shaker Heights, OH (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/722,083

(22) Filed: Oct. 2, 2017

(65) Prior Publication Data
US 2019/0068289 A1 Feb. 28, 2019

Related U.S. Application Data (60) Provisional application No. 62/550,084, filed on Aug. 25, 2017.

(51) Int. Cl.
| | |
|---|---|
| *H04B 10/564* | (2013.01) |
| *H04W 52/02* | (2009.01) |
| *H04B 7/024* | (2017.01) |
| *H04B 10/079* | (2013.01) |

(52) U.S. Cl.
CPC .......... *H04B 10/564* (2013.01); *H04B 7/024* (2013.01); *H04B 10/07955* (2013.01); *H04W 52/02* (2013.01)

(58) Field of Classification Search
CPC .................. H04B 10/564; H04B 7/024; H04B 10/07955; H04W 52/02
See application file for complete search history.

(56) References Cited

U.S. PATENT DOCUMENTS

| | | | |
|---|---|---|---|
| 8,867,477 B2 | 10/2014 | Song et al. | |
| 9,241,275 B2 | 1/2016 | Kloper et al. | |
| 9,301,263 B2 | 3/2016 | Lee et al. | |
| 2010/0278136 A1* | 11/2010 | Oyman | H04B 7/026 370/330 |

(Continued)

OTHER PUBLICATIONS

Maede Zolanvari, et al., "Emerging MIMO Technologies: Distributed, Cooperative, Massive, 3D, and Full Dimension MIMO", Apr. 17, 2016, 13 pgs.

(Continued)

*Primary Examiner* — Brian D Nguyen
(74) *Attorney, Agent, or Firm* — Edell, Shapiro & Finnan, LLC (57) ABSTRACT

Presented herein are techniques to ensure power emitted by APs during a cooperative MIMO transmission is within certain limits. For a transmission to be made from two or more wireless access points using cooperative multiple-input multiple-output (MIMO) techniques, a measure of separation is determined between the two or more access points. Precoding of signals to be transmitted by the two or more access points is adjusted so as to derate the signals to be transmitted or disable the cooperative nature of the transmission from the two or more access point depending on the measure of separation so that a combined output power from the two or more access points is within a limit.

20 Claims, 5 Drawing Sheets

(56) References Cited

U.S. PATENT DOCUMENTS

| | | | | |
|---|---|---|---|---|
| 2015/0282098 | A1* | 10/2015 | Lee | H04W 52/42 |
| | | | | 375/267 |
| 2016/0359597 | A1* | 12/2016 | Seo | H04W 72/082 |
| 2017/0126458 | A1* | 5/2017 | Shattil | H04L 27/2628 |
| 2017/0279506 | A1* | 9/2017 | Shattil | H04B 7/026 |
| 2018/0248639 | A1* | 8/2018 | He | H04J 11/0053 |

OTHER PUBLICATIONS

Sébastien Simoens, et al., "Cooperative MIMO Communications", Information Theoretical Limits and Practical Coding Strategies, PhD Thesis Dissertation, Technical University of Catalonia (UPC), Jan. 3, 2009, 205 pgs.

Chih-yu Hsu, et al., "Power minimization for cooperative MIMO-OFDM systems with individual user rate constraints", EURASIP Journal on Wireless Communications and Networking, Feb. 9, 2016, 16 pgs.

Juanfei Shu, et al., "A Novel Power Efficient Location-Based Cooperative Routing with Transmission Power-Upper-Limit for Wireless Sensor Networks", Sensors, ISSN 1424-8220, www.mdpi.com/journal/sensors, 2013, 29 pgs.

Yuyang Peng, et al., "A New Cooperative MIMO Scheme Based on SM for Energy-Efficiency Improvement in Wireless Sensor Network", Hindawi Publishing Corporation, The Scientific World Journal, vol. 2014, Article ID 975054, http://dx.doi.org/10.1155/2014/975054, Feb. 20, 2014, 10 pgs.

* cited by examiner

POSITIONAL PRECODING DERATION FOR COOPERATIVE MIMO

PRIORITY CLAIM

This application claims priority to U.S. Provisional Application No. 62/550,084, filed Aug. 25, 2017, the entirety of which is incorporated herein by reference.

TECHNICAL FIELD

The present disclosure relates to wireless networking systems and devices.

BACKGROUND

Wireless infrastructure systems (e.g. Wi-Fi® systems) that employ coordinated, cooperative multiple-input multiple-output (MIMO) techniques across multiple access points (APs) may affect emitted power of coherent streams. This is contrast to the behavior of a single AP having a multiplicity of transmitters and antennas with characteristics associated with total conducted power, individual antenna gain, and array gain.

DESCRIPTION OF EXAMPLE EMBODIMENTS

Overview

Presented herein are techniques to ensure power emitted by APs during a cooperative MIMO transmission is within certain limits. For a transmission to be made from two or more wireless access points using cooperative MIMO techniques, a measure of separation is determined between the two or more access points. Precoding of signals to be transmitted by the two or more access points is adjusted so as to derate the signals to be transmitted or disable the cooperative nature of the transmission from the two or more access points depending on the measure of separation so that a combined output power from the two or more access points is within a limit.

DETAILED DESCRIPTION

A solution is being developed for Wi-Fi networks to deploy a coherent distributed RF (radiohead or AP frontend) together with a centralized baseband (BB) controller function in which cooperative MIMO (coMIMO) techniques are leveraged to enhance system capacity. In coMIMO, the distributed radioheads (RH) are radio frequency (RF)-synchronized and the centralized BB controller effects multi-user MIMO (MU-MIMO) or beamformed (BF) transmissions from several radioheads coherently.

However, an end user might misuse this solution by placing the radioheads very close to each other, thereby resulting in array gains that are harmful to the performance of other devices in the unlicensed band.

Combining emissions. There may be emission limits that apply to the total of emissions from all outputs of the transmitter. Thus, emissions from the transmitter outputs must be combined or summed before comparing measured emissions to the emission limit. In one example, these emission limits (gain and/or power) may be defined by a regulatory body/authority or may be considered good practice and not necessarily promulgated by a regulatory body/authority.

Accounting for array gain. Correlation between signals transmitted from different antennas can lead to array gain, which increases the directional gain of the device and leads to higher radiated levels in some directions. The contribution of array gain to the directional gain of the transmitter needs to be considered in rule parts where conducted in-band emission limits vary with directional gain, or in situations in which conducted measurements are combined with directional antenna gain to determine compliance with in-band radiated limits.

Array gain is referred to as "directional gain" in the expression below. Directional gain penalizes the total conducted power normally by a dB for dB ratio.

$$DirectionalGain = 10\log\left[\frac{\sum_{j=1}^{N_{SS}}\left\{\sum_{k=1}^{N_{ANT}} g_{j,k}\sqrt{P_{j,k}}\right\}^2}{N_{ANT}}\right] \quad \text{Equation 1}$$

where $N_{SS}$=number of spatial streams of data;

$N_{ANT}$=total number of antennas;

$g_{j,k}=10^{G_k/20}$ if the kth antenna is being fed by spatial stream j, or zero if it is not;

$G_k$ is the gain in dBi of the kth antenna; and $P_{j,k}$ is the relative normalized power (in linear terms, not decibels) of spatial stream j feeding the kth antenna, normalized such that $$\sum_{j=1}^{N_{SS}}\left\{\sum_{k=1}^{N_{ANT}} P_{j,k}\right\} = N_{ANT}.$$

$P_{j,k}$=0 if spatial stream j does not feed the kth antenna.

Array gain is typically considered as a deration for conducted output power whenever its inclusion with intrinsic element gain pushes the total gain beyond the total antenna gain criterion. Array gain is associated with increasing the multiplicity of transmitters and antennas on a device, so the additive power of additional transmitters PLUS the additional array gain potential both need to be considered against the emission limits.

The rules assume collocated antennas, where the assumptions of additive power and array gain apply. In cooperative MIMO systems, the coherent streams are emitted by transmitters/antennae that are not co-located; in fact, they are separated by many wavelengths (typically >100) which introduces significant path loss between emitters and obviates the additive/array effects of collocated ones.

There may be a corner case condition where APs are spaced minimally, thereby creating a collocated condition analogous to a single device for combinatorial powers and gains.

The challenge is to automatically detect the inter-radio-head (inter-AP) separation and automatically eliminate/disable cooperative MIMO operation among the APs when the separation is below a certain threshold. In accordance with the embodiments presented herein, a self-aware, self-adjusting precoding mechanism is provided that varies the application of cooperative MIMO resource scheduling based on separation distance between APs. When the separation distance approaches zero, precoding reduces power of a given spatial stream to that which could be emitted by a single access point. As separation distance increases to a threshold, the full cooperative (independent) stream power assignment is acceptable. The transmission to be sent (by the coMIMO techniques) may be multiple spatial streams or a single stream that is beamformed to create multiple beamformed versions of the same stream.

Self-awareness of the distance of the APs may be determined from a priori knowledge of the locations of the APs (i.e., installation information), or using location techniques now known or hereinafter developed, including:

Receive Signal Strength Information (RSSI) measurements between APs to determine path loss between APs Time Difference of Arrival (TDOA) location transactions between APs Channel sounding from which channel state information (CSI) is derived between APs Processing CSI and looking at the singular values resulting from different combinations of APs For purposes of generalization, the term "APs", instead of radiohead (RH), refers to any devices that can transmit coherently together.

Figure 1:
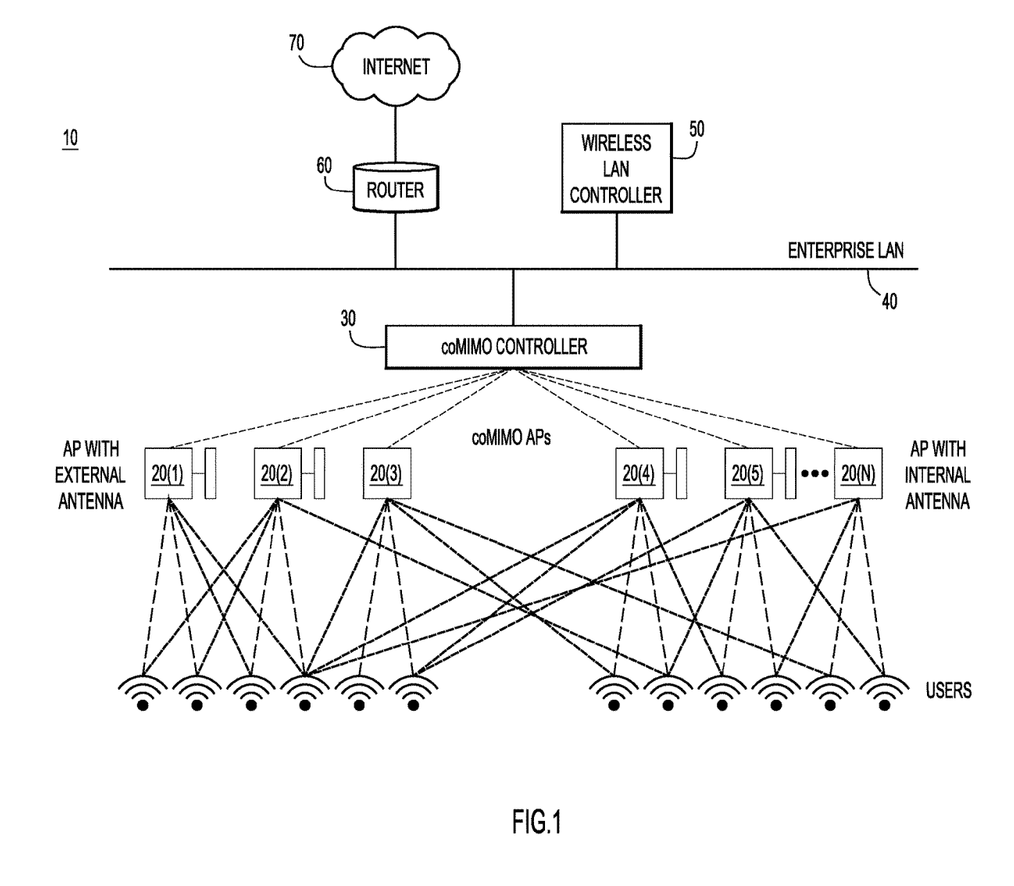
FIG. 1 is a system block diagram in which the precoding of signals may be derated based on separation between two or more APs involved in a cooperative MIMO transmission, according to an example embodiment.

Referring first to FIG. 1, a block diagram of a system according to the embodiments presented herein is shown. The system 10 includes a plurality of APs (coMIMO APs) 20(1)-20(N) that are configured to participate in coMIMO transmissions to users (client devices) according to the techniques presented herein, and to receive transmissions from the users. The APs 20(1)-20(N) are in communication, via a local area network (LAN), with a coMIMO controller 30. The coMIMO controller 30 is in turn in communication, on an enterprise LAN 40, with a wireless LAN controller 50, and with one or more routers 60 that have connectivity to the internet 70. Each of the APs 20(1)-20(N) may include one or multiple antennas, and corresponding one or multiple transmitter/receiver paths.

Figure 2:
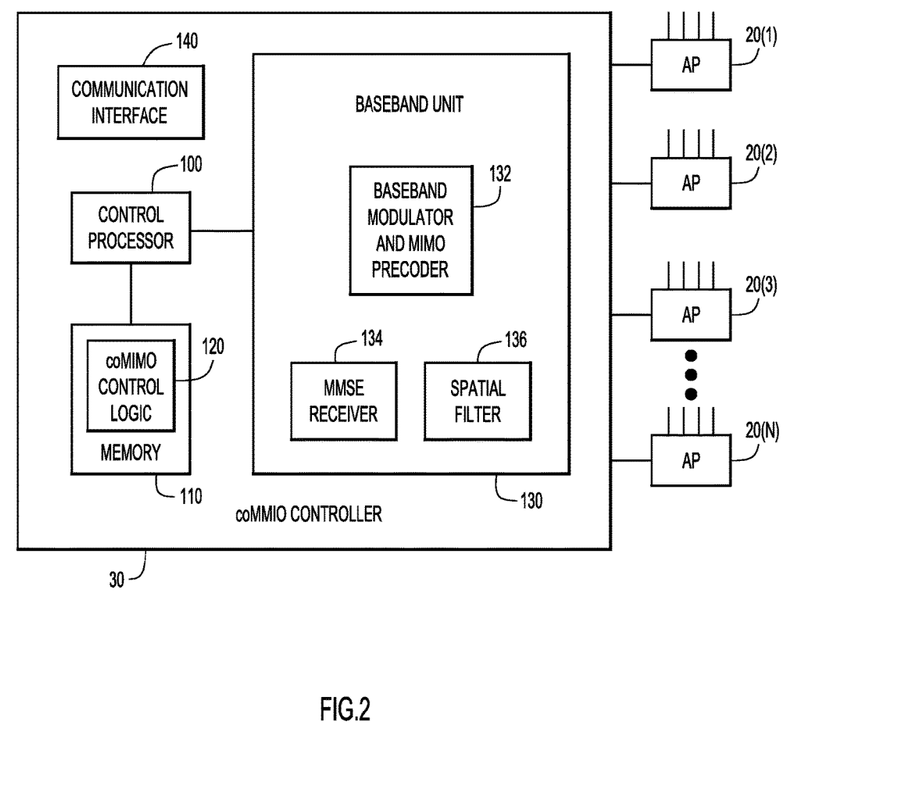
FIG. 2 is a block diagram of a controller that may be configured to perform the precoding of signals to be transmitted by two or more APs involved in a cooperative MIMO transmission, according to an example embodiment.

FIG. 2 shows the coMIMO controller 30 in greater detail. In one embodiment, the coMIMO controller 30 performs the centralized MIMO processing functions. The coMIMO controller 30 includes a control processor 100 to perform various functions, including media access control (MAC) functions and the coMIMO control functions described herein, memory 110 that stores executable instructions for coMIMO control logic 120 that causes the control processor 100 to perform the control functions, and a baseband unit 130. The baseband unit 130 performs baseband processing functions, and to this end includes a baseband modulator and precoder 132, a MMSE receiver 134 and filtering functions such as a spatial filter 136. There is also a communication interface 140, such as a network interface card, that enables network connectivity between the coMIMO controller 30 and the APs 20(1)-20(N).

The memory 110 may take the form of read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

The control processor 100 is embodied by one or more microprocessors, for example, that executes the instructions stored in memory 110, and in particular the instructions for the coMIMO control logic 120. By executing the coMIMO control logic 120, the control processor 100 can determine when and how to assign a deration function to the precoding performed by the baseband modulator and MIMO precoder 132 so that the output power from the APs 20(1)-20(N) is within a limit, depending on the separation of the one or more APs participating in a coMIMO transmission.

Figure 3:
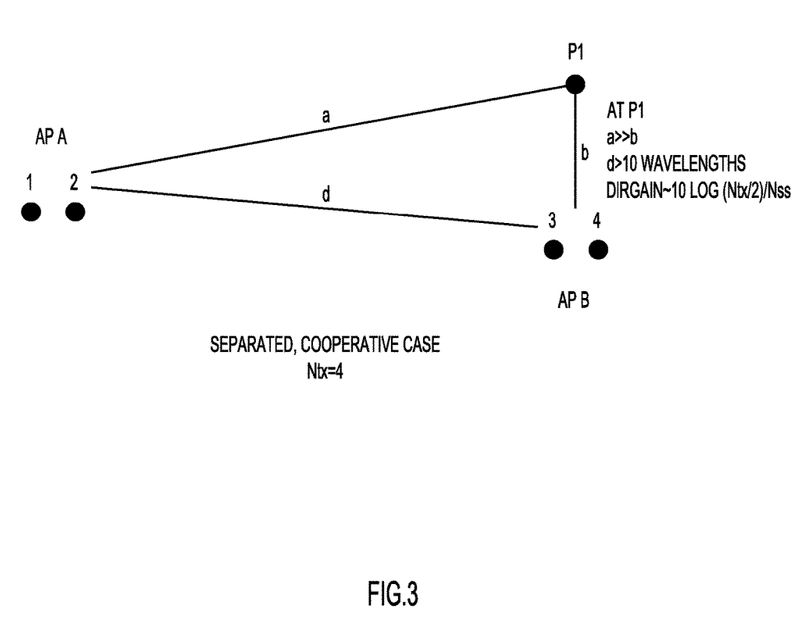
FIG. 3 is a diagram showing how two closely located APs that are participating in a cooperative MIMO transmission may cause a combined power that could exceed certain limits, according to an example embodiment.

Reference is now made to FIG. 3. FIG. 3 shows a diagram of two APs, each with two antennas, from which a coMIMO transmission may be made. AP A includes antennas 1 and 2 and AP B includes antennas 3 and 4. The distances between the APs is shown as "d" and the distance between AP A and some point P1 is "a" and the distance between AP B and point P1 is "b". It can be shown that receivers (representing intended clients (or other users of the unlicensed frequency band) in positions where the path loss is significantly disparate between APs do not see an equal contribution in total channel field strength from the two APs. At those points, the effective RF power and directional gain is dominated by the closer AP, which is AP B in the example shown in FIG. 3. Whether or not multiple APs are emitting power on the same spatial stream, and being constrained by the co-located array gain deration, is not of great concern in the coverage areas of the APs.

As an example, in the two-transmitter case, a function which assigns precoding weighting may take the general form a shelving function as represented in the table below:

| Separation Distance | Deration (dB) |
| --- | --- |
| 0 | −6 (asymptote) |
| Λ/2 | −6 (asymptote) |
| 10Λ | −5 |
| 20Λ | −3 |
| 40Λ | −1 |
| 100Λ | 0 (asymptote) | where Λ represents the wavelength of the characteristic signal.

This function arbitrarily assigns a deration to the conducted output power based on the same observed array gain deration. In the case that the number of transmitters (Ntx)=2, it includes array gain deration 3 dB=10 logNtx plus a conducted power deration 3 dB=10 logNtx for a total of 3+3=6 dB. This formula can be extended to different numbers of transmitters per AP and linear combinations of multiple APs.

Stated another way, this function abruptly eliminates cooperative MIMO operation (sharing of spatial stream data for beamforming or nulling) across APs when inter-AP distance is below a minimum distance. Above that minimum distance, no deration to the RF output power is anticipated. For example, any cooperation may be disabled between two APs that are determined to:

1. Have a path loss to one another that is less than some threshold.

2. That combined produces a maximum singular value that is greater than some threshold relative to the total number of transmitter chains in that pair.

3. Location calculation that shows they are within some minimum separation.

The adjustment of the precoding may take the form of a lookup table with derating values as depicted above, or may take the form of a mathematical computation that is based on the measure of separation distance between the two or more APs involved in the transmission.

A simple rule of inter-AP spacing for enabling/disabling cooperative MIMO may be useful for precoding management of the cooperative effect. Depending on the actual field strength impact in the far field due to cooperative MIMO operation, it may be desirable to constrain cooperative MIMO effects. It is beneficial that the intelligence of the location-aware, channel-aware network be used for precoding management of the cooperative effect.

Figure 4:
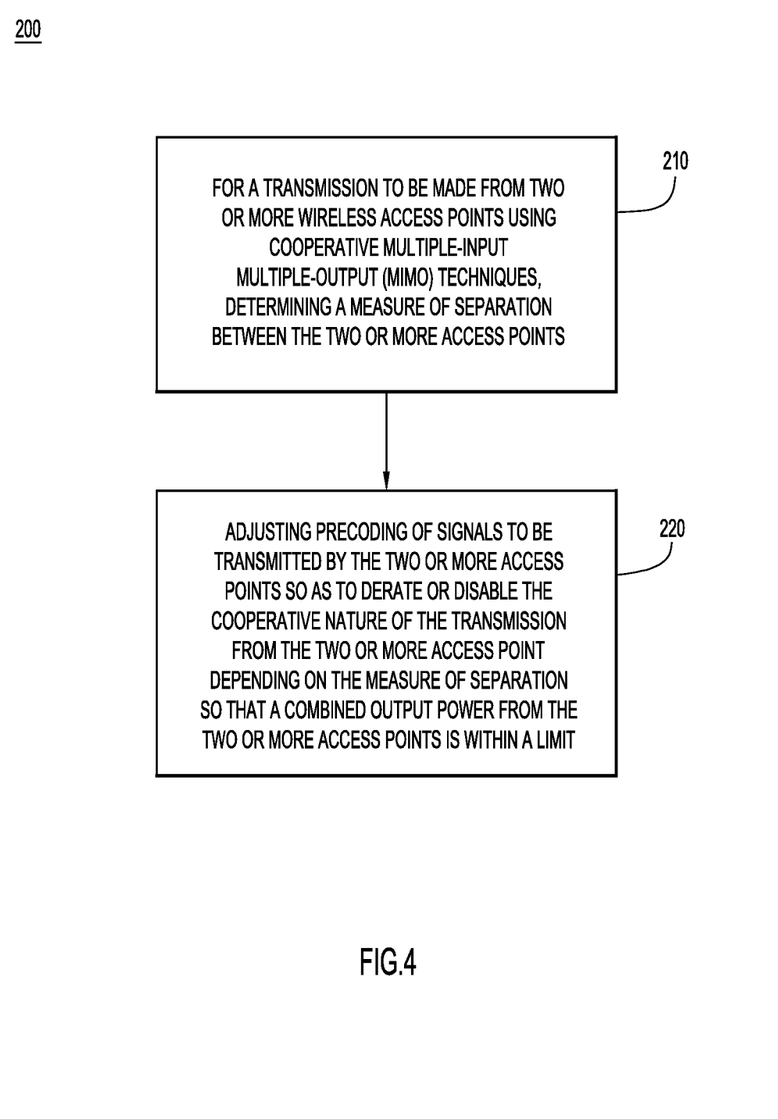
FIG. 4 is a flow chart of a method to adjust the precoding of signals based on a measure of separation of two or more APs involved in a cooperative MIMO transmission, according to an example embodiment.

Referring to FIG. 4, a flow chart is shown of a method 200 according to an example embodiment. The method 200 may be performed at the coMIMO controller 30 or at a given AP that is in involved in a coMIMO transmission and has access to the measure of separation with respect to the one or more other APs involved in the transmission. At 210, for a transmission to be made from two or more wireless access points using cooperative multiple-input multiple-output (MIMO) techniques, a measure of separation between the two or more access points is determined. Any of the techniques referred to above, or other similar techniques, may be used to determine the measure of separation. The measure of separation may be different depending on the particular APs involved in a given coMIMO transmission to one or more intended recipient clients. Data representing the measurement of separation between respective APs may be stored at coMIMO controller and retrieved for the APs involved in a given coMIMO transmission. At 220, the precoding of signals to be transmitted by the two or more access points is adjusted so as to derate the signals to be transmitted or disable the cooperative nature of the transmission from the two or more access point depending on the measure of separation so that a combined output power from the two or more access points is within a limit.

There may be two modes of deration. In a first mode, APs/RH's "join" or "do not join" cooperatively a transmission based on the distance threshold. Thus, below or less than the distance threshold, there is zero cooperation across spatial streams, and above the distance threshold, there is full enablement of cooperation. In a second mode, the APs'/RHs' cooperative power (power allocated to the shared spatial stream) is derated based on distance. This deration can be fully ON or fully OFF, or can be based on distance. In one example, two APs cooperating equals a total of 6 dB deration per spatial stream.

Figure 5:
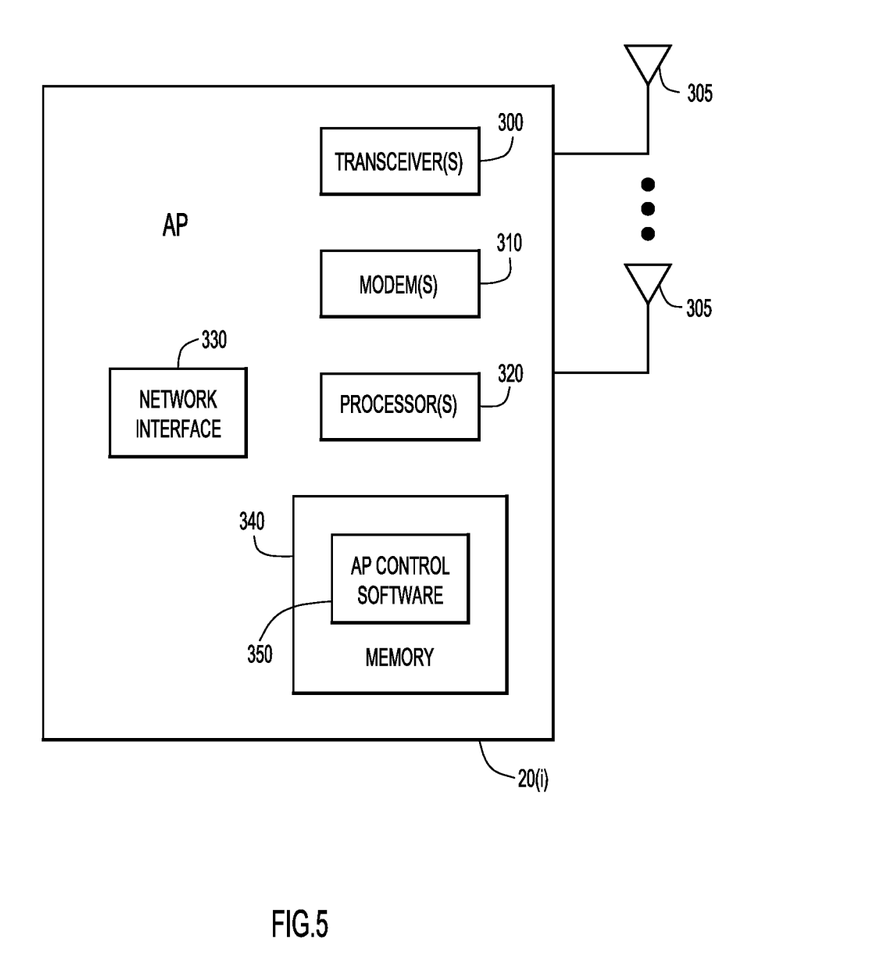
FIG. 5 is a block diagram of an AP configured to participate in the techniques presented herein, according to an example embodiment.

FIG. 5 illustrates a block diagram of an AP 20(i) configured to participate in the mechanisms described herein, according to one embodiment. The AP includes, among other components, one or more WLAN transceivers 300, one or more antennas 305, one or more modems 310, one or more processors 320, a network interface (e.g., network interface card) 330, and a memory 340. The one or more transceivers 300 and one or more modems 310 may be part of one or more chipsets that consists of one or more application specific integrated circuits configured to support a WLAN standard, such as the IEEE 802.11 standard. The memory 340 stores instructions for AP control software 350, that when executed by the one or more processors 320, cause the one or more processors to 320 perform the AP-side operations as part of the mechanisms described herein.

In another embodiment, the APs take the form of RH units that include only radio frequency (RF) functionality and the baseband processing and MAC processing are performed in a central controller, e.g., the coMIMO controller 30 shown in FIGS. 1 and 2. Thus, a RH unit includes antennas 305, network interface 330, RF transmitters and RF receivers, which may be part of the transceivers 300 shown in FIG. 5. The RH may not even need a processor 320. The RH simply takes the baseband transmit signals received from the coMIMO controller 30 and upconverts them for RF transmission using one or more RF transmitters, and downconverts received RF signals to baseband signals which are sent to the coMIMO controller 30.

To summarize, the techniques presented herein ensure acceptable array gain and maximum Effective Isotropic Radiated Power (EIRP) of a coherent transmission by tracking path loss or separation between cooperative APs. Automatic configuration of cooperative MIMO precoding weightings is performed to ensure acceptable gain and power by sensing network AP locations and assuring array gain back-offs are applied when APs are in close proximity. The solution achieves intelligent system behavior by virtue of its self-awareness/adjustment and inability to be altered by manual re-configuration.

In summary, in one form, a method is provided comprising: for a transmission to be made from two or more wireless access points using cooperative multiple-input multiple-output (MIMO) techniques, determining a measure of separation between the two or more access points; and adjusting precoding of signals to be transmitted by the two or more access points so as to derate the signals to be transmitted or disable the cooperative nature of the transmission from the two or more access point depending on the measure of separation so that a combined output power from the two or more access points is within a limit.

As described above, the measure of separation may be determined from one or more of: access point installation; receive signal strength information measurements between the two or more access points to determine a path loss; time difference of arrival (TDOA) location transactions between the two or more access points; and channel sounding between the two or more access points.

Further, in one form, the adjusting operation may include gradually derating the precoding of signals to be transmitted by the access points as a function of the measure of separation between the two or more access points. In another form, the adjusting operation may include disabling cooperative MIMO operation for the transmission when the measure of separation is less than a predetermined threshold.

As described above, the transmission may include multiple spatial streams, or a single stream that is to be beamformed to produce a plurality of beamformed versions of the same stream.

Moreover, the adjusting operation may comprise, when the measure of separation between any two access points is less than a predetermined threshold, disabling cooperation of the two access points across spatial streams of the transmission, and when the measure of separation between any two access points is greater than the predetermined threshold, fully enabling cooperation of the two access points across spatial streams of the transmission.

Further, the adjusting operation may comprise derating power allocated to a spatial stream for which two or more access points cooperate based on the measure of separation between the two or more access points.

In another form, an apparatus is provided comprising: a network interface configured to enable network communication with two or more wireless access points that are configured to wirelessly communicate using cooperative multiple-input multiple-output (MIMO) techniques with one or more wireless clients in a wireless network; and a processor coupled to the network interface, wherein the processor is configured to: determine a measure of separation between the two or more access points; and adjust precoding of signals to be transmitted by the two or more access points so as to derate the signals to be transmitted or disable the cooperative nature of the transmission from the two or more access points depending on the measure of separation so that a combined output power from the two or more access points is within a limit.

In another form, a system is provided comprising two or more wireless access points configured to send a transmission using cooperative multiple-input multiple-output (MIMO) techniques; and a controller coupled to the two or more wireless access points, wherein the controller is configured to adjust precoding of signals to be transmitted by the two or more access points so as to derate the signals to be transmitted or disable the cooperative nature of the transmission from the two or more access points depending on the measure of separation so that a combined output power from the two or more access points is within a limit.

In still another form, one or more computer readable storage media encoded with software comprising computer executable instructions and when the software is executed by a processor, the processor is caused to perform a method comprising: for a transmission to be made from two or more wireless access points using cooperative multiple-input multiple-output (MIMO) techniques, determining a measure of separation between the two or more access points; and adjusting precoding of signals to be transmitted by the two or more access points so as to derate the signals to be transmitted or disable the cooperative nature of the transmission from the two or more access points depending on the measure of separation so that a combined output power from the two or more access points is within a limit.

The above description is intended by way of example only. From the above description, those skilled in the art will perceive improvements, changes and modifications. Such improvements, changes and modifications are within the skill of one in the art and are intended to be covered by the appended claims.

What is claimed is:

1. A method comprising:
   for a transmission to be made from two or more wireless access points using cooperative multiple-input multiple-output (MIMO) techniques, determining a measure of separation between the two or more access points; and
   adjusting precoding of signals to be transmitted by the two or more access points so as to derate the signals to be transmitted or disable the cooperative nature of the transmission from the two or more access points depending on the measure of separation so that a combined output power from the two or more access points is within a limit.

2. The method of claim 1, wherein the measure of separation is determined from one or more of: access point installation; receive signal strength information measurements between the two or more access points to determine a path loss; time difference of arrival (TDOA) location transactions between the two or more access points; and channel sounding between the two or more access points.

3. The method of claim 1, wherein adjusting comprises gradually derating the precoding of signals to be transmitted by the access points as a function of the measure of separation between the two or more access points.

4. The method of claim 1, wherein adjusting comprises disabling cooperative MIMO operation for the transmission when the measure of separation is less than a predetermined threshold.

5. The method of claim 1, wherein the transmission includes multiple spatial streams.

6. The method of claim 1, wherein the transmission includes a single stream that is to be beamformed to produce a plurality of beamformed versions of the same stream.

7. The method of claim 1, wherein adjusting comprises, when the measure of separation between any two access points is less than a predetermined threshold, disabling cooperation of the two access points across spatial streams of the transmission, and when the measure of separation between any two access points is greater than the predetermined threshold, fully enabling cooperation of the two access points across spatial streams of the transmission.

8. The method of claim 1, wherein adjusting comprises derating power allocated to a spatial stream for which two or more access points cooperate based on the measure of separation between the two or more access points.

9. An apparatus comprising:
   a network interface configured to enable network communication with two or more wireless access points that are configured to wirelessly communicate using cooperative multiple-input multiple-output (MIMO) techniques with one or more wireless clients in a wireless network; and
   a processor coupled to the network interface, wherein the processor is configured to:
      determine a measure of separation between the two or more access points; and
      adjust precoding of signals to be transmitted by the two or more access points so as to derate the signals to be transmitted or disable the cooperative nature of the transmission from the two or more access points depending on the measure of separation so that a combined output power from the two or more access points is within a limit.

10. The apparatus of claim 9, wherein the processor is configured to adjust by gradually derating the precoding of signals to be transmitted by the access points as a function of the measure of separation between the two or more access points.

11. The apparatus of claim 9, wherein the processor is configured to adjust by disabling cooperative MIMO operation for the transmission when the measure of separation is less than a predetermined threshold.

12. The apparatus of claim 9, wherein the transmission includes multiple spatial streams.

13. The apparatus of claim 9, wherein the transmission includes a single stream that is to be beamformed to produce a plurality of beamformed versions of the same stream.

14. The apparatus of claim 9, wherein the processor is configured to adjust by, when the measure of separation between any two access points is less than a predetermined threshold, disabling cooperation of the two access points across spatial streams of the transmission, and when the measure of separation between any two access points is greater than the predetermined threshold, fully enabling cooperation of the two access points across spatial streams of the transmission.

15. The apparatus of claim 9, wherein the processor is configured to adjust by derating power allocated to a spatial stream for which two or more access points cooperate based on the measure of separation between the two or more access points.

16. A system comprising:
   two or more wireless access points configured to send a transmission using cooperative multiple-input multiple-output (MIMO) techniques; and
   a controller coupled to the two or more wireless access points, wherein the controller is configured to adjust precoding of signals to be transmitted by the two or more access points so as to derate the signals to be transmitted or disable the cooperative nature of the transmission from the two or more access points depending on the measure of separation so that a combined output power from the two or more access points is within a limit.

17. The system of claim 16, wherein the controller is configured to adjust by gradually derating the precoding of signals to be transmitted by the access points as a function of the measure of separation between the two or more access points.

18. The system of claim 16, wherein the controller is configured to adjust by disabling cooperative MIMO operation for the transmission when the measure of separation is less than a predetermined threshold.

19. The system of claim 16, wherein the controller is configured to, when the measure of separation between any two access points is less than a predetermined threshold, disabling cooperation of the two access points across spatial streams of the transmission, and when the measure of separation between any two access points is greater than the predetermined threshold, fully enabling cooperation of the two access points across spatial streams of the transmission.

20. The system of claim 16, wherein the controller is configured to adjust by derating power allocated to a spatial stream for which two or more access points cooperate based on the measure of separation between the two or more access points.

* * * * *